Figure 1:
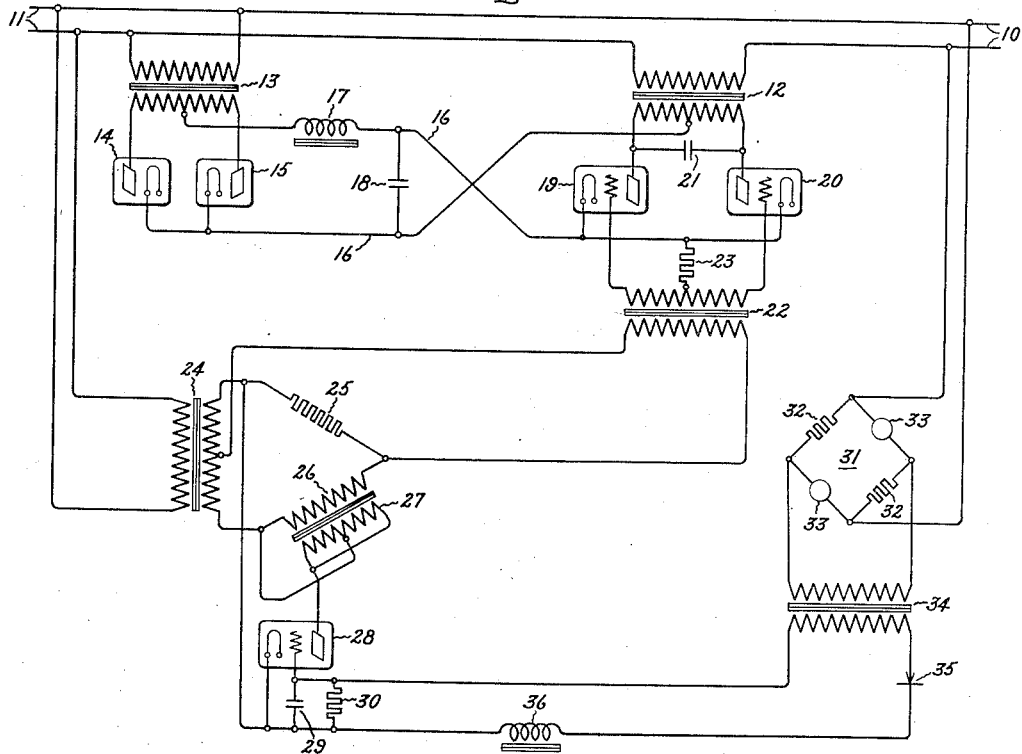

Jan. 10, 1933. A. S. FITZ GERALD 1,893,768
ELECTRIC REGULATOR
Filed April 17, 1931

Inventor:
Alan S. FitzGerald.
by Charles E. Tullar
His Attorney.

Patented Jan. 10, 1933

1,893,768

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

ELECTRIC REGULATOR

Application filed April 17, 1931. Serial No. 530,895.

My invention relates to apparatus for regulating the electrical condition of an alternating current circuit and more particularly to an electrical regulating apparatus utilizing electric valves which is particularly suitable for regulating the voltage of an alternating current feeder circuit. My invention relates further to electric control circuits which are particularly suitable for controlling the electric valves of my electrical regulating apparatus but which are also of general application in other types of regulating apparatus.

Heretofore there have been devised numerous arrangements for regulating the voltage or other electrical condition of an alternating current circuit. Certain of these arrangements involve the use of contacts and other moving parts which tend to become unreliable in operation and are subject to wear and other deterioration in use. Certain other regulating apparatus have been devised utilizing electric valves for effecting the desired regulation. In regulating apparatus of this latter type it has been customary to secure the desired regulation by controlling the average conductivity of the electric valves, which tends to introduce objectionable harmonics into the regulated alternating current circuit.

It is an object of my invention to provide an improved electric regulating apparatus utilizing electric valves which will overcome the above-mentioned disadvantages of the arrangements of the prior art and which will be simple, economical and reliable in operation.

It is a further object of my invention to provide an improved electric regulating apparatus utilizing electric valves in which a series alternating potential is introduced between the supply and load circuit and in which the phase relation of this series potential is controlled in response to variations in an electrical condition of the regulated circuit.

It is a further object of my invention to provide an improved regulating apparatus in which a portion of the energy of the alternating current supply circuit is first rectified and then inverted by means of an electric valve inverter, the output of the electric valve inverter being connected to a booster transformer interconnecting the supply and load circuits and in which means are provided for varying the phase of the alternating current output of the inverter in response to variations in an electrical condition of the regulated circuit.

It is a further object of my invention to provide improved electric control circuits which are particularly suitable for controlling the electric valves of my improved regulating apparatus but which are also of general application in the control of the various types of regulating circuits well known in the art.

In accordance with my invention an alternating current feeder circuit is connected to an alternating current supply circuit through a booster transformer, the primary winding of which is energized from the supply circuit through the combination of an electric valve rectifier and an electric valve inverter. An impedance phase shifting circuit energized from the supply circuit is provided for controlling the phase relation of the grid potentials of the electric valve inverter. The impedance of one of the elements of the phase shifting circuits is controlled in response to variations in the electrical condition to be regulated, for example, the voltage of the feeder circuit, whereby the phase relation of the potential supplied by the booster transformer is varied with respect to that of the supply circuit to vary the resultant potential of the feeder circuit. I have also provided improved control circuits for the impedance phase shifting means for securing regulation of the engine governor, dynamic, and position types respectively. These several electric control circuits are particularly suitable for controlling the phase relation of the grid potentials of the electric valve inverter, but are also of general application in the various types of regulating circuits well known in the art, more particularly in those circuits in which the regulation is secured by controlling the phase relation of the grid potential of an electric valve.

Figure 2:
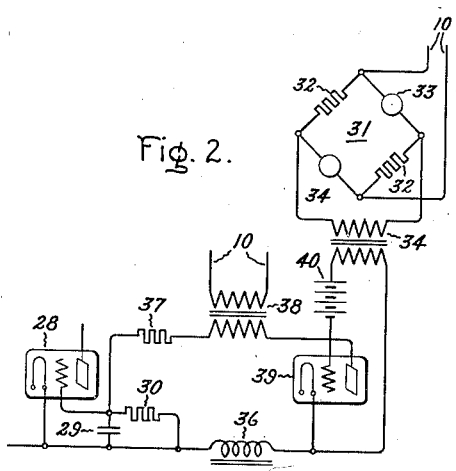
Figure 3:
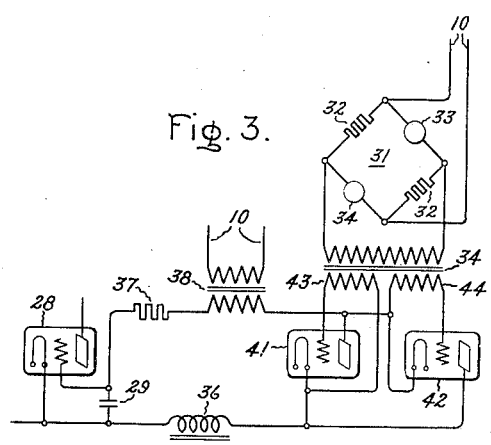

For a better understanding of my invention, together with other and further objects thereof, reference is had to the following description taken in connection with the accompanying drawing and its scope will be pointed out in the appended claims. Fig. 1 of the accompanying drawing is a diagrammatic representation of my invention as applied to an arrangement for maintaining constant the voltage of an alternating current feeder circuit, while Figs. 2 and 3 show certain modifications of the control circuit for the electric valve inverter.

Referring now to Fig. 1 of the drawing, I have illustrated an apparatus for regulating the voltage of an alternating current load circuit 10 energized from an alternating current supply circuit 11. This apparatus comprises a booster transformer 12 provided with a secondary winding interconnecting the circuits and an electric valve rectifier-inverter combination for energizing the primary winding of the booster transformer. The rectifier arrangement comprises a transformer 13 energized from the alternating current supply circuit 11 and a pair of electric valves 14 and 15 connected in the conventional manner to obtain full wave rectification. The direct current circuit 16 of this rectifier arrangement preferably includes a smoothing reactor 17 and a capacitor 18. The direct current circuit 16 is adapted to supply the inverter circuit comprising the primary winding of the booster transformer 12, electric valves 19 and 20 and a commutating capacitor 21. Electric valves 19 and 20 are each provided with an anode, a cathode and a control grid, and may be of any of the several types well known in the art, although I prefer to use vapor electric discharge valves. The control grids of the valves 19 and 20 are connected to their common cathode circuit through opposite halves of the secondary winding of a grid transformer 22 and a current limiting resistor 23. The above described inverter apparatus per se constitutes no part of my present invention but is disclosed and claimed in United States Letters Patent No. 1,800,002 granted April 7, 1931 upon the application of E. F. W. Alexanderson.

In order to control the phase relation of the alternating current output of the electric valve inverter, and thus the bucking or boosting effect of the transformer 12, the primary winding of grid transformer 22 is energized from an impedance phase shifting circuit comprising a transformer 24, the primary winding of which is connected to the suppply circuit 11, and a resistor 25 and saturable reactor 26 connected across the secondary winding of transformer 24. The reactor 26 is provided with a saturating winding 27 energized from the secondary winding of the transformer 24 through an electric valve 28, which is preferably a three-electrode high vacuum pure electron discharge valve. The grid of the valve 28 is excited with the potential across a capacitor 29 which is preferably provided with a discharge resistor 30. The potential of capacitor 29 is adapted to be varied in accordance with variations in the voltage of the load circuit 10. This is accomplished by means of a voltage responsive bridge 31 comprising two pairs of opposite arms 32 and 33 having dissimilar current-resistance characteristics, examples of which are well known in the art. One diagonal of this bridge circuit is connected to the load circuit 10 while the capacitor 29 is adapted to be charged with the unbalance potential across the other diagonal through a transformer 34 and a unilaterally conducting device shown as a contact rectifier 35. A smoothing reactor 36 may be included in this charging circuit.

In explaining the operation of the above described apparatus, it will be assumed that the phase relation of the grid potentials of the valves 19 and 20 is such as to maintain normal voltage on the circuit 10 under existing load conditions. The operation of the rectifying arrangement comprising the transformer 13 and electric valves 14 and 15 will be understood by those skilled in the art so that a detailed explanation is not deemed necessary. Similarly a detailed explanation of the operation of the electric valve inverter will be found in the above mentioned Alexanderson patent. In general, however, the operation of this apparatus relies upon the fact that, during the interval when one of the valves, for example, valve 19, is conducting, the commutating capacitor 21 becomes charged to substantially twice the potential of the direct current circuit 16 through the primary winding of the transformer 12. At the end of the half cycle, when the grid potential reverses polarity so as to render the valve 20 conducting, commutating capacitor 21 serves to start the current in electric valve 20 and simultaneously interrupt it in electric valve 19. It will be apparent that the phase relation of the potential delivered to booster transformer 12 will be determined by the phase relation of the grid potentials supplied by grid transformer 22, which in turn is determined by the relative values of the impedance of the resistor 25 and reactor 26. Under the assumed conditions, the bridge circuit 31 is sufficiently unbalanced to maintain such a negative potential on the upper terminal of capacitor 29 that the valve 28 supplies the correct excitation to the saturating winding 27 to maintain the above-mentioned phase relation of the grid potentials. In case the voltage of the circuit 10 drops below normal, due to an increase in load or to any other cause, the unbalance of the bridge circuit 31 will be decreased so that the negative potential on the capacitor 29 will be correspondingly decreased, thus increasing the conductivity of electric valve 28. An increase in the conductivity of the valve 28 will increase the saturating current in the winding 27 thus decreasing the impedance of reactor 26. A decrease in the impedance of reactor 26 tends to advance the phase of the potential applied to the grid transformer 22 and thus bring the potential supplied to the load circuit 10 and the booster transformer 12 more nearly into phase coincidence with the alternating supply potential, which will bring the voltage of the load circuit 10 back to normal. Obviously, with an increase in the voltage of the load circuit 10 above normal, the reverse operation will take place.

The above described voltage control arrangement is of the so-called engine governor type in which the voltage is not maintained exactly constant at some fixed value, but in which it is allowed to vary within narrow predetermined limits in accordance with variations in the load on the circuit. The feature of this arrangement which effects the regulation described above is that the unbalance voltage of the bridge 31 varies at an extremely high rate with respect to variations of the voltage of the circuit 10 which causes the bridge to became unbalanced and that the bridge 31 operates entirely on one side of its balance point. That is, the limits of unbalance of the voltage responsive bridge 31 necessary to control the impedance phase shifting circuit over its complete range of operation, and thus control the potential of the transformer 12 between conditions of maximum buck and maximum boost, may correspond to a range in variation of the voltage of the circuit 10 of only a few volts. This type of regulation has the advantage of extreme simplicity and rapidity of action.

In some cases, however, it may be desirable to maintain the average voltage of the load circuit 10 constant at some fixed value. This may be accomplished by regulating circuit illustrated in Fig. 2, which is of the dynamic type, that is, one in which the voltage of the load circuit is rapidly varied between two fixed voltages above and below the normal voltage respectively, the relative intervals during which the voltage is maintained in its upper value or its lower value determining the average voltage of the circuit. In this arrangement, the power circuit and the phase shifting circuit for controlling the grids of the valves 19 and 20 is the same as that illustrated in Fig. 1. In this case, however, the voltage responsive bridge 31 is balanced when the voltage of the circuit 10 is normal, so that the unbalance voltage reverses polarity when the voltage of the load circuit passes through the normal value. In this arangement the grid capacitor 29 of the valve 28 is charged through a circuit including a current limiting resistor 37, the secondary winding of a transformer 38, the primary winding of which is energized from the circuit 10, an electric valve 39 and a reactor 36. As in the previous arrangement a resistor 30 is connected in parallel to capacitor 29. Electric valve 39 is provided with an anode, a cathode, and a control grid and is preferably of the vapor electric discharge type. The unbalance voltage of the bridge 31 excites the grid of electric valve 39 through the control transformer 34 and a negative bias battery 40. In this control circuit the connections are such that the grid potential of the electric valve 39 is in phase with its anode potential when the voltage responsive bridge 31 is unbalanced in a positive direction, that is, when the voltage applied to circuit 10 is above normal. Assume for example, under these conditions, that when the voltage of the circuit 10 is above normal, the unbalance voltage of the bridge 31 is of such a polarity that the grid and anode potentials of electric valve 39 are in phase and that the capacitor 29 is charged through this valve in such a direction that the potential of its upper terminal increases negatively. The voltage of the load circuit 10 will now be lowered as described above and, as it passes through normal, the polarity of the potential applied to the grid of electric valve 39 will reverse so that this valve will become non-conducting. The capacitor 29 will now slowly discharge through resistor 30 so that the grid of the valve 28 will become more positive and the voltage of the load circuit 10 will be correspondingly raised. When the voltage of the circuit 10 rises above normal the grid polarity of the electric valve 39 will again be reversed and the above described cycle will be repeated indefinitely. The constants of the capacitor 29 and its charging circuit may be so chosen that the voltage of the load circuit 10 will vary within narrowly prescribed limits and with such rapidity that there will be no appreciable flicker in the voltage of the load circuit 10. The average voltage of the load circuit 10 will, of course, depend upon the relative duration of the intervals when it is above the normal voltage and when it is below normal voltage.

In case it is desired to maintain very exact regulation of the load circuit 10, and the circuit is not subject to extreme fluctuations in load, the regulating arrangement illustrated in Fig. 3 may be preferable. This regulator is of the so-called position type in which, in case the voltage of the load circuit 10 deviates from normal, it will always be brought back to the exact value for which the regulator is set. In this arrangement, the charging circuit of the capacitor 29 includes two vapor electric valves 41 and 42 reversely connected in parallel, so that the capacitor may be charged to either polarity by means of the transformer 34, energized from the load circuit 10. In this case the discharge resistor of the capacitor 29 is preferably omitted. Control transformer 34 is provided with two secondary windings 43 and 44 which are adapted to excite the control grids of valves 41 and 42, respectively. The grids of the valves 41 and 42 are excited with the same polarity from the transformer 34, while it is seen that the anodes of the valves 41 and 42 have an opposite polarity so that when the voltage of the circuit 10 is below normal the grid potential of one valve will be in phase with its anode potential and it will be conducting, while when the voltage of the circuit 10 is above normal the other valve will be conducting. When the voltage of the circuit 10 is normal the grid potential of both valves will be zero and either valves having a positive grid potential characteristics will be used or a negative bias battery will be included in the two grid circuits, so that both valves are non-conducting under this condition. Since the electric valve 28 operates with a negative grid potential, the charge on the capacitor 29 will be maintained constant, neither of the valves 41 or 42 will be conductive, and the phase relation of the potential supplied by the boosting transformer 12 will be maintained constant to keep the voltage of the load circuit 10 at normal.

From the description of the operation of the arrangement illustrated in Figs. 1 and 2, it will be clear that, when the voltage of the circuit 10 rises above normal, one of the valves 41 or 42 will be rendered conducting to change the potential across capacitor 29 in such a direction as to bring the voltage of the circuit 10 back to normal, while when the voltage of the circuit 10 varies in the opposite direction the other electric valve will be conducting to vary the potential of the capacitor 29 in an opposite direction.

While I have described what I at present consider the preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:—

1. The combination of an alternating current circuit, a booster transformer connected in said circuit, electric valve means for energizing said booster transformer from said circuit, and means responsive to an electrical condition of said circuit for controlling the phase relation of the potential applied to said booster transformer by said valve means.

2. The combination of an alternating current circuit, a booster transformer connected in said circuit, electric valve means for deriving direct current from said alternating current circuit, other electric valve means for inverting said direct current to alternating current for energizing said booster transformer, and means responsive to an electrical condition of said circuit for controlling the phase relation of the output of said inverting means.

3. The combination of an alternating current circuit, a booster transformer provided with a secondary winding connected in said circuit and with a primary winding, rectifier means including an electric valve connected to said circuit, means for inverting said rectified current into alternating current for energizing said primary winding, said inverting means including an electric valve provided with a control grid, and means for impressing upon said control grid an alternating potential variable in phase in accordance with variations of an electrical condition of said circuit.

4. In combination, a regulated circuit, means including an electric valve provided with a control grid for regulating an electrical condition of said circuit, a bridge circuit connected to be responsive to an electrical condition of said regulated circuit and designed for a normal range of operation entirely on one side of its balance point, and means for continuously varying the grid potential of said valve in accordance with variations in the unbalance of said bridge.

5. In combination, a regulated circuit, means including an electric valve provided with a control grid for regulating an electrical condition of said circuit, a voltage responsive bridge connected to said circuit and designed for a normal range of operation entirely on one side of its balance point, a grid circuit for said valve including a capacitor and a circuit for charging said capacitor in accordance with the unbalance voltage of said bridge.

6. In combination, an alternating current circuit, means including an electric valve provided with a control grid for regulating an electrical condition of said circuit, a voltage responsive bridge connected to said circuit and designed for a normal range of operation entirely on one side of its balance point, a grid circuit for said valve including a capacitor and a discharge resistor, and a circuit including a unilaterally conductive device for charging said capacitor from the unbalance voltage of said bridge.

7. In combination, a regulated circuit, means including an electric valve provided with a control grid for regulating an electrical condition of said circuit, a normally balanced bridge circuit connected to said regulated circuit, a grid circuit for said valve including a capacitor, and means for charging said capacitor with a unidirectional potential variable in accordance with variations in the unbalance voltage of said bridge circuit.

8. In combination, a regulated circuit, means including an electric valve for regulating an electrical condition of said circuit, a normally balanced bridge circuit connected to said regulated circuit, means for continuously varying the conductivity of said valve in accordance with variations in the unbalance voltage of said bridge circuit in one direction, and means for varying the conductivity of said valve at a constant rate when said bridge circuit becomes unbalanced in the opposite direction.

9. In combination, a regulated circuit, means including an electric valve provided with a control grid for regulating an electrical condition of said circuit, a normally balanced bridge circuit connected to said regulated circuit, a grid circuit for said valve including a capacitor, and means for charging said capacitor when said bridge circuit is unbalanced in one direction and for discharging said capacitor when it is unbalanced in an opposite direction.

10. In combination, a regulated circuit, means including an electric valve provided with a control grid for regulating an electrical condition of said circuit, a normally balanced voltage responsive bridge connected to said regulated circuit, a grid circuit for said valve including a parallel connected capacitor and resistor, means for charging said capacitor from said regulated circuit including a second electric valve provided with a control grid, and a circuit for exciting the grid of said second valve in accordance with the unbalance potential of said bridge.

11. In combination a regulated circuit, means including an electric valve provided with a control grid for regulating an electrical condition of said circuit, a normally balanced bridge circuit connected to said regulated circuit, a grid circuit for said valve including a capacitor and means for charging said capacitor in accordance with the direction and magnitude, respectively, of the unbalance voltage of said bridge circuit.

12. In combination, a regulated circuit, means including an electric valve provided with a control grid for regulating an electrical condition of said circuit, a normally balanced voltage responsive bridge connected to said regulated circuit, a grid circuit for said valve including a capacitor, a circuit for charging said capacitor from said regulated circuit including a pair of electric valves reversely connected in parallel and each provided with a control grid, and a circuit for similarly exciting the grids of said pair of valves in accordance with the unbalance voltage of said bridge.

13. Apparatus for producing a potential variable in phase with respect to the potential of an alternating current circuit in response to variations in magnitude of a second alternating potential comprising a plurality of impedance elements, having different resistance components, energized from said circuit, means responsive to said second potential for producing a unidirectional potential, and electric valve means responsive to said unidirectional potential for controlling the impedance of one of said impedance elements.

14. Apparatus for producing a potential variable in phase with respect to the potential of an alternating current circuit in response to variations of an electrical condition of said circuit comprising a plurality of impedance elements, having different resistance components, energized from said circuit, a resistance bridge responsive to an electrical condition of said circuit, means responsive to an unbalance of said bridge for producing a unidirectional potential the polarity of which is determined by the direction of unbalance of said bridge, and electric valve means controlled by said unidirectional potential for controlling the impedance of one of said impedance elements.

15. Apparatus for producing a potential variable in phase with respect to the potential of an alternating current circuit in response to variations of the potential of said circuit comprising a plurality of impedance elements, having different resistance components, energized from said circuit, a normally balanced resistance bridge responsive to the potential of said circuit, a control circuit energized from said alternating current circuit and including a pair of electric valves connected in parallel and in opposition, means for rendering one of said valves conducting in accordance with an unbalance of said bridge in one direction and for rendering the other valve conducting in accordance with an unbalance of said bridge in the other direction, an impedance element in said control circuit, and electric valve means responsive to the potential across said impedance for controlling the impedance of one of said first mentioned impedance elements.

In witness whereof, I have hereunto set my hand.

ALAN S. FITZ GERALD.